United States Patent [19]

Makram-Ebeid et al.

[11] Patent Number: 5,830,141
[45] Date of Patent: Nov. 3, 1998

[54] IMAGE PROCESSING METHOD AND DEVICE FOR AUTOMATIC DETECTION OF REGIONS OF A PREDETERMINED TYPE OF CANCER IN AN INTENSITY IMAGE

[75] Inventors: Sherif Makram-Ebeid, Dampierre; Jean-Pierre Roux, Sucy-En-Brie, both of France; Eric Cohen-Solal, Briarcliff Manor, N.Y.

[73] Assignee: U.S. Philips Corporation, New York, N.Y.

[21] Appl. No.: 721,914

[22] Filed: Sep. 27, 1996

[30] Foreign Application Priority Data

Sep. 29, 1995 [FR] France .................................. 95 11499

[51] Int. Cl.⁶ ...................................................... A61B 5/05
[52] U.S. Cl. .............................. 600/407; 382/128; 378/62
[58] Field of Search .......................... 128/653.1; 382/128; 378/62, 132, 131, 156; 600/407

[56] References Cited

U.S. PATENT DOCUMENTS 5,260,871  11/1993  Goldberg ............................ 364/413.02
5,365,429  11/1994  Carman .

OTHER PUBLICATIONS

"Computer Vision" by Dana H. Ballard et al, Prentice–Hall, Inc., pp. 75–88.

Extraction and Measurement of Lesion Edge Blur In Mammograms by Computer Image Analysis, by J.H. Richter et al, School of Computer Science, pp. 302–307.

"Image Processing for Recognition of Tumor on Mammography" Seiji Yabashi et al, Department of Electrical and Computer Engineering, pp. 182–185.

"Computer Detection of Stellate Lesions in Mammograms" by W. Philip Kegelmeyer, Jr., Spie vol. 1660 Biomedical Image Processing and Three–Dimensional Microscopy 1992, pp. 446–454.

*Primary Examiner*—Marvin M. Lateef
*Assistant Examiner*—Eleni Mantis Mercader
*Attorney, Agent, or Firm*—Jack D. Slobod; Dwight H. Renfrew

[57] ABSTRACT

An image processing method for automatic detection of regions of a predetermined type of cancer in an intensity image of a part of a human or animal body, includes, for a number of points of a part of said image, the determination of a set (referred to as a vector) of components formed by characteristic values derived from the intensity distribution around each point in said part of the image, and the use of a classification system for determining the probability of the point associated with said vector belonging to a region of said part of the image which corresponds to the predetermined type of cancer or to another region. An image processing device for carrying out such a method is utilized in conjunction with a digital medical imaging system.

16 Claims, 11 Drawing Sheets

IMAGE PROCESSING METHOD AND DEVICE FOR AUTOMATIC DETECTION OF REGIONS OF A PREDETERMINED TYPE OF CANCER IN AN INTENSITY IMAGE

BACKGROUND OF THE INVENTION

1. Field of the Invention

The invention relates to an image processing method for automatic detection of regions of a predetermined type of cancer in an intensity image of a part of a human or animal body. The invention also relates to an image processing device for carrying out the method, and to a system for radiology which includes the device. The invention is used in radiology for automatic detection of specific cancers, referred to as "opacities", in mammograms.

2. Description of the Related Art

An image processing method for the recognition of tumors in mammographic images is already known from the publication "Image processing for recognition of tumor in mammography" by Seiji YABASHI et al in "PROCEEDINGS OF THE 1989 INTERNATIONAL SYMPOSIUM ON NOISE AND CLUTTER REJECTION IN RADARS AND IMAGING SENSORS", IEICE, 1989. This method concerns the processing of mammograms in order to detect suspect opacities which could correspond to cancers of the breast. In conformity with the cited publication, after digitization of the mammogram film intensity profiles f are traced along the lines of the digital image. The profiles f show: a first linear function f1 with a positive slope, corresponding to an increase of the thickness of normal tissues towards the chest wall; variations corresponding to opacities modulating the linear function f1 and expressed by a second function f2; and a continuous horizontal component, corresponding to the background, which is expressed by a constant G. The first function f1, relating to the normal tissues, is first smoothed by a median filter, after which the second function f2, relating to the opacities, is obtained by subtracting the smoothed first function f1 and the background G from the original profile f. The second function f2 is subsequently subjected to various treatments, including a Sobel operator and a Laplacian operator, making the opacities more distinct in the image examined by the radiologist for diagnostic purposes, by enhancement of the contrast of objects in the images or by tracing lines of equivalent grey levels.

A problem exists in that the causes of the intensity variations expressed by the second function f2 may differ from those of the suspect opacities corresponding to cancers; therefore, they are called "positive errors" by the expert. The known method does not propose any solution to distinguish the opacities which are actually due to cancers from opacities which are due to other, non-suspect structures of the breast. Moreover, the proposed method is not an automatic method in a sense that the radiologist still has to examine the images resulting from the processing and decide himself whether a specific region is to be classified as a suspect region or not.

SUMMARY OF THE INVENTION

It is an object of the invention to provide a method in the form of a diagnostic tool which offers automatic detection of suspect regions in the mammographic image.

The method includes, for a number of points of a part of said image, the determination of a set, referred to as a vector, of components formed by characteristic values derived from the intensity distribution around each point in said part of the image, and the use of a classification system for determining the probability of the point associated with said vector belonging to a region of said part of the image which corresponds to the predetermined type of cancer or to another region.

An advantage of the method proposed by the invention consists in the high precision of the automatic detection of cancers, with a positive true alarm rate which may be as high as 100% with a positive false alarm rate which is less than or equal to 2%.

An image processing device for the automatic detection of regions of a predetermined type of cancer in intensity images includes means for processing a number of points of a part of said image in order to determine a set, referred to as a vector, of components formed by characteristic values derived from the intensity distribution around each point in said part of the image, and a classification system for determining the probability of the point associated with said vector being related to a region of said part of the image which corresponds to the predetermined type of cancer or to another region.

An advantage of this device consists in that it automatically supplies the radiologist with images in which very small cancers are detected and reproduced.

Another advantage offered by said automation is that the processing of the medical image can take place directly, without human intervention, and possibly in real time, resulting in an important diagnostic tool which quickly supplies the radiologist with the important elements for the diagnosis of cancers in a stage in which the latter are still very small and hence extremely difficult to detect by means of conventional means.

BRIEF DESCRIPTION OF THE DRAWINGS

The invention will be described in detail hereinafter with reference to the accompanying drawings; therein.

DESCRIPTION OF THE PREFERRED EMBODIMENTS

The Method

The invention relates to a method for automatic detection of cancers of a predetermined type in an intensity image of a part of a human or animal body in order to form a diagnostic tool for the radiologist. The invention will be described hereinafter in respect of its application for the detection of cancers of a predetermined type, referred to as "opacities", in a mammographic image, which opacities have blurred edges which cannot be modelled as opposed to other specific lesions of regular shape such as stellar lesions or microcalcifications. The method involves the detection of all opacities of the predetermined type which are present in an image, without exception, on the basis of the elements present in said single image. The invention also relates to the detection of opacities having a diameter of 3 to 4 mm, corresponding to beginning cancers which are non-tangible and not visible to ultrasound.

Figure 6A:
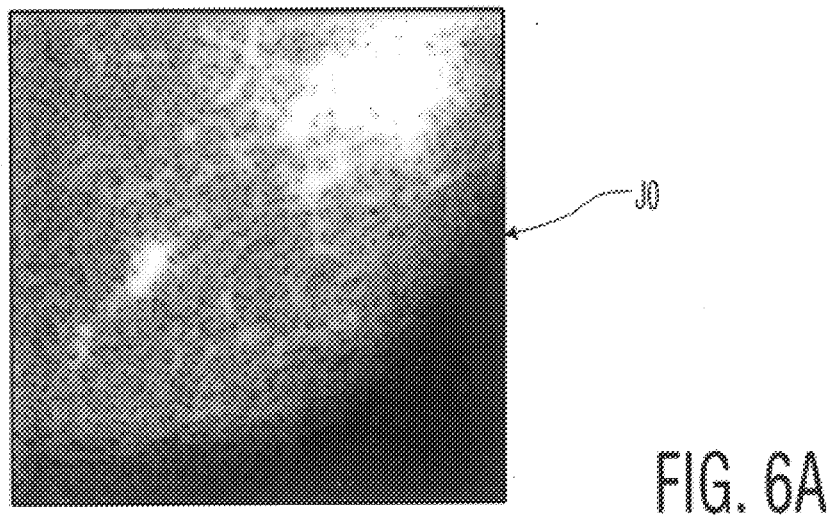
FIGS. 6A to 6C show an original image, an image of this kind smoothed during the first phase of the first processing step, and a simplified drawing of various regions of a breast organ shown in the form of a profile, respectively.

The acquisition of mammographic images can be performed by digital radiography; however, the invention does not take into account the method of acquisition of the image. FIG. 6A shows, by way of example, an original mammographic image J0 in the form of an intensity image arranged in a two-dimensional matrix of pixels of digitized intensity. Referring to FIG. 6C, the breast 1 exhibits two principal zones on a background 9: a deep breast zone 2 of substantially constant thickness, and a peripheral breast zone 3 whose thickness quickly decreases from the deep breast zone 2 to the skin 4.

During the processing of mammographic images for the detection of cancers, difficulties must be taken into account; for example:

- the breast organ 1 is radiographed in profile and does not have a constant thickness;
- the objects to be detected are opacities with blurred edges and appear as whitish regions on a field formed by other objects of the radiographed breast 1;
- the dimensions of the objects to be detected may be very small: from 3 to 4 mm;
- the field on which these opacities are to be detected also contains other opacities which result from the normal texture of the tissues of the breast 1 and may be confused with the cancers;
- the locations of the opacities to be detected are essentially variable within the breast 1;
- the shape and dimensions of the opacities to be detected may also vary substantially from one image to another;
- the opacities corresponding to the texture of normal tissues can easily obscure the opacities corresponding to the cancers, because the radiographic image integrates the information contained in the superposed tissues;
- no potential cancer whatsoever may be omitted or neglected during the processing of a mammographic image.

The method takes all these difficulties into account.

As appears from the FIGS. 1 to 4, the method comprises two principal steps: a first step which includes, for a number of points of a part of said image, the determination of a set (referred to as a vector) of components which are formed by characteristic values derived from the intensity distribution around each point in said part of the image, and a second step which includes the use of a classification system for determining the probability of the point associated with said vector being related to a region of said image part which corresponds to the predetermined type of cancer or to another region, and segmentation and reproduction of the cancers in a final image.

An important technical problem encountered in the processing of X-ray images, and notably the processing of mammographic images, is that the radiographed organ may have an arbitrary orientation in the original image; moreover, the tumor has variable shapes as outlined above.

The analysis of the image according to the present method, therefore, is based on the determination of characteristics in a manner which is independent of the orientation. The problem is solved by carrying out, during the first step of the method, first and second filtering phases by means of differential operators of the order 1 and 2, offering rotation-invariant results. These operators are called "invariants" for short.

The method will be described in detail hereinafter.

I. FIRST STEP: DETERMINATION OF VECTORS OF INTENSITY CHARACTERISTICS ASSOCIATED WITH THE PIXELS OF THE IMAGE

Figure 1:
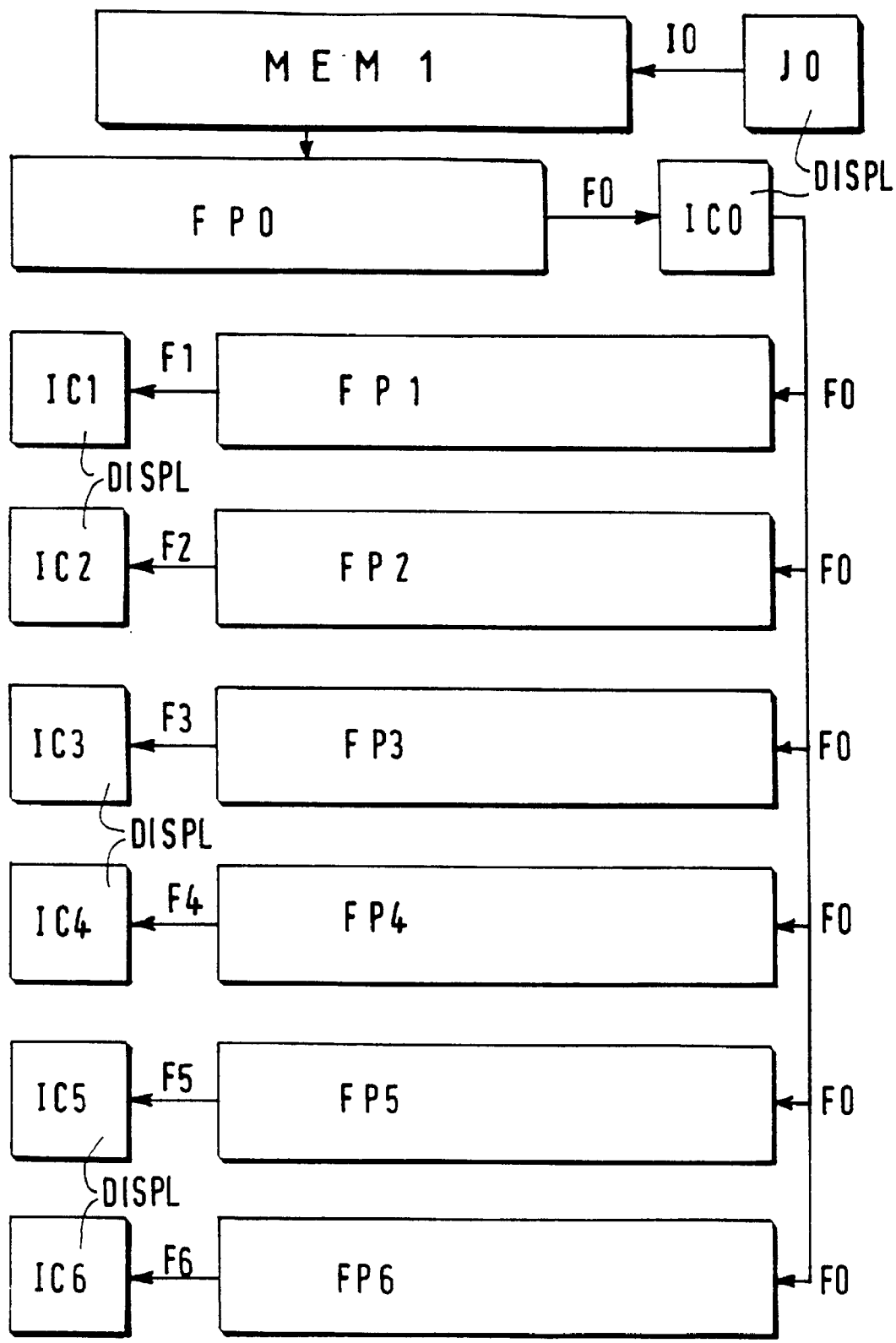
FIG. 1 shows a flow chart of a first phase of a first step of a method for the automatic detection of cancers of a predetermined type in a mammogram.

I.1 First Filtering Phase (FIG. 1)

Preliminary smoothing FP0

Figure 6B:
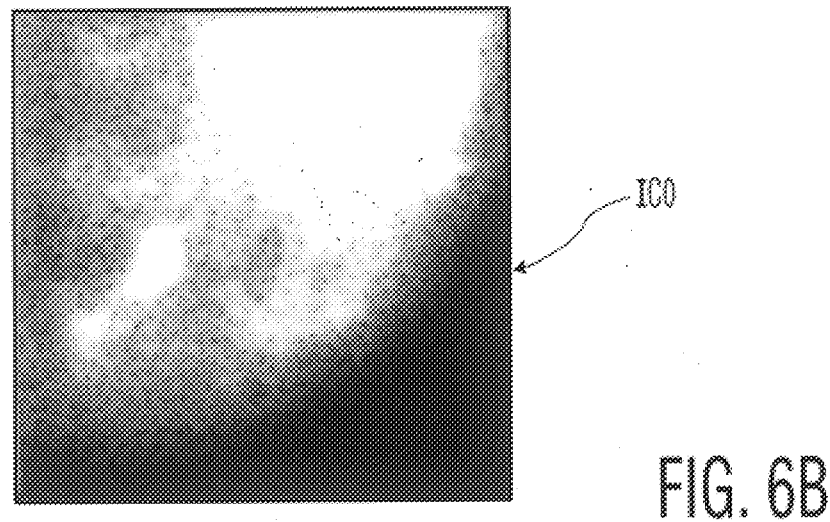
Figure 6C:
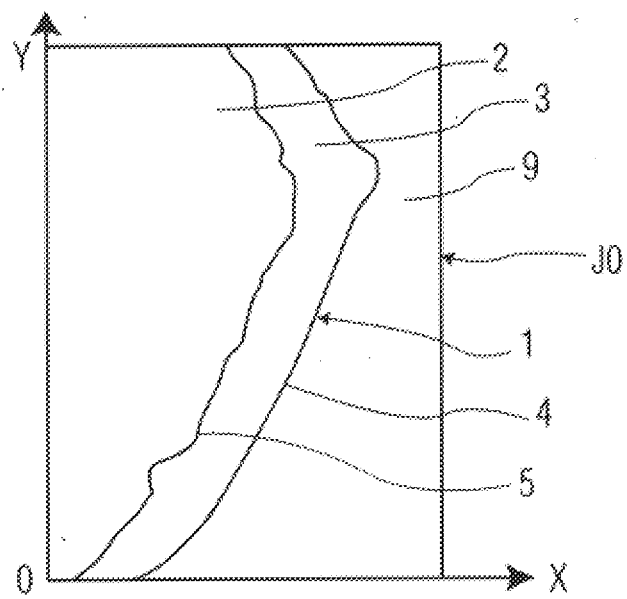

As is shown in FIG. 1, a preliminary filtering operation transforms the original image J0 into an image IC0 (as shown in FIG. 6B) by smoothing with the resolution of tumorous regions to be detected and of the local structures of this image.

Such smoothing can be performed by means of a filter having a Gaussian core whose Gaussian function is called G5. The width of the core of this filter, denoted by the reference σ, is chosen to be of the order of magnitude of the objects to be detected, so preferably 5 pixels. The width σ of the core of a filter is to be understood to mean the width at half height of the pulse response at the intensity of the operator with which the intensity of the image is convoluted in order to obtain the filtering result. The pulse response of such a Gaussian filter G5 is shown, by way of example, as a solid line in FIG. 10A in which the intensity is plotted on the axis Z in arbitrary units.

The passage of the Gaussian core filter G5 actually constitutes the formation, at the current pixel P0 denoted by its coordinates on the axes X and Y in the two-dimensional matrix, of the convolution product of its intensity IO and the Gaussian function G5 in conformity with the relation (1):

$$FO = IO * G5,$$

in which the symbol * symbolizes the convolution product. The Gaussian function is provided by recursive filtering.

Determination of first structural characteristics

The smoothed image IC0 is subsequently subjected to filtering by a series of rotation-invariant oriented filters in order to enhance intensity variations and to accentuate structural characteristics in the image smoothed with the resolution of objects to be detected. The responses of these filters produce components of the desired characteristic vector. These filters are formed, for example by differential operators of the order 1 and 2 which are selected from among the following in accordance with the invention:

FP1: modulus of the intensity gradient

Figure 7A:
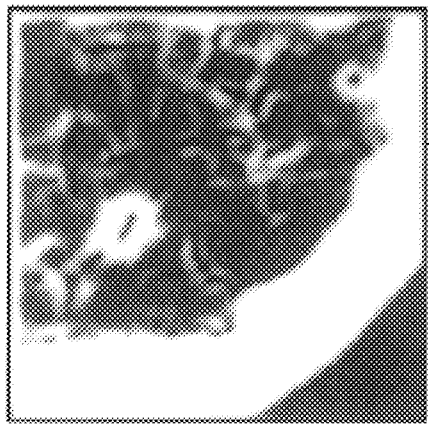
FIGS. 7A to 7F show the intensity images obtained by passage through the first series of filters of FIG. 1.

An invariant filter FP1, calculating the modulus of the intensity gradient at each pixel P0 to be treated, is applied to the smoothed image IC0 in order to transform this image into a resultant image IC1, as shown in FIG. 7A, in which the edges of objects are reproduced.

The intensity gradient will be referred hereinafter as GR1 and the intensity gradient modulus as $\|GR1\|$. The intensity gradient is obtained by calculation of the first-order derivatives of the smoothed intensity function F0, along the axis X and Y, at each pixel to be treated in the image IC0. The intensity gradient can be obtained by any method known to those skilled in the art. In a preferred version, the intensity gradient GR1 can be obtained by application, in directions parallel to the axes X and Y, of oriented filters which are known as "Sobel" filters which are referred hereinafter as: $Sobel_x$ according to the axis X; $Sobel_y$ according to the axis Y.

The use of Sobel filters is described in a general study book "Computer Vision", by Dana H. Ballard and Christopher M. Brown, published by PRENTICE-HALL, INC., Englewood, Cliffs, N.J. 07632, USA, pp. 77, lines 6 to 17, in relation to FIG. 3.10C.

Application of the filters $Sobel_x$ and $Sobel_y$ produces the intensity gradients $GR1_x$ and $GR1_y$, at each current pixel P0, which are given by the formula:

$$GR1_x = \delta(F0)/\delta x = Sobel_x (F0)$$

and $$GR1_y = \delta(F0)/\delta = Sovel_y (F0)$$

The gradient modulus is given by:

$$\|GR1\| = [(GR1^2_x + GR1^2_y)]^{1/2} \quad (2d)$$

By application of the filter FP1 an intensity $F1 = \|GR1\|$ is calculated for the pixels P0 treated in the smoothed image IC0 and applied to the two-dimensional matrix in order to form the new intensity image IC1 of FIG. 7A.

FP2: Maximum value of positive rectified oriented second derivatives

Figure 7F:
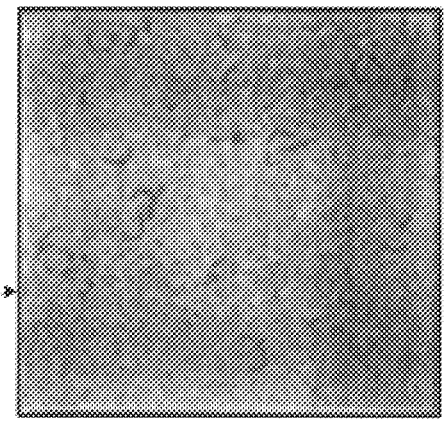
Figure 7B:
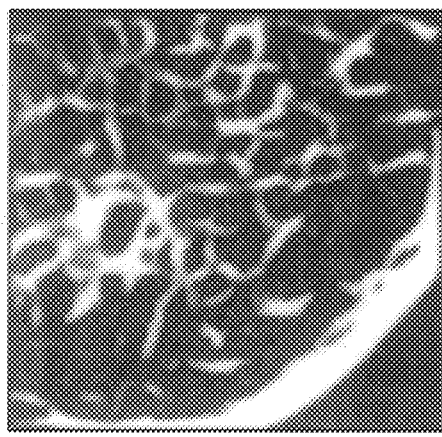

An invariant filter FP2, calculating the positive rectified second-order maximum oriented derivatives, is applied to the smoothed image IC0 in order to transform this smoothed image into a resultant image IC2, as shown in FIG. 7B, in which dark elongate objects are reproduced on a bright background.

The second-order derivatives of the smoothed intensity function F0 are first calculated. The second-order derivatives in x, in y and in xy are written as:

$$(L1)_{xx} = \frac{\partial^2(F0)}{\partial x^2} \; ; \; (L1)_{yy} = \frac{\partial^2(F0)}{\partial y^2} \; ; \; (L1)_{xy} = \frac{\partial^2(F0)}{\partial x \, \partial y}$$

The "oriented second derivative" along an axis enclosing an angle $\Theta$ with respect to the axis X of the image treated is referred to as $(L1)_{\Theta\Theta}$ and is subsequently calculated by way of the formule (4), by means of the preceding second-order derivatives:

$$(L1)_{\Theta\Theta} = \tfrac{1}{2}[(L1)_{xx}+(L1)_{yy}] + \tfrac{1}{2}[(L1)_{xx}-(L1)_{yy}] \cos 2\Theta + (L1)_{xy} \sin 2\Theta \quad (4)$$

The second-order derivatives of the intensity function F0 can be obtained by any method known to those skilled in the art. In a preferred version, the second-order derivatives can be obtained by application, in directions parallel to the axes X and Y, of oriented Sovel filters again, such as $Sovel_x$ and $Sovel_y$, to the intensity gradients $GR1_x$ and $GR1_y$ previously calculated during the application of the invariant filter FP1.

By application of said oriented filters $Sobel_x$ and $Sobel_y$, the second-order derivatives are obtained in conformity with the formula:

$$(L1)_{xx} = Sobel_x (GR1)_x \quad (5a)$$
$$(L1)_{yy} = Sobel_y (GR1)_y \quad (5b)$$
$$(L1)_{xy} = Sobel_{xy} (GR1)_{xy} \quad (5c)$$

enabling calculation of the second-order oriented derivative $(L1)_{\Theta\Theta}$ given by the formule (4).

Subsequently, at the current pixel the maximum of the oriented second derivative is evaluated, denoted by $MAX_\Theta [(L1)_{\Theta\Theta}]$, supplying a maximum intensity value which is then assigned to this current pixel, but only if this value is positive; if this value is negative, the value 0 is assigned to said current pixel as the intensity value replacing the calculated value.

This positive rectification operation of the maximum values of the second-order oriented derivatives yields the intensity value:

$$F_2 = MAX_\Theta^P [(L1)_{\Theta\Theta}]$$

which is assigned to the corresponding pixel of the matrix in order to form the new intensity image IC2.

FP3: Maximum value of the negative rectified oriented second derivatives

Figure 7C:
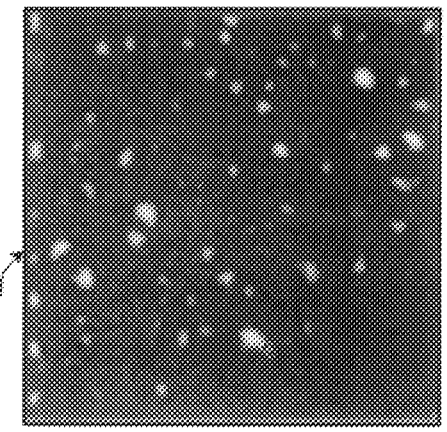

An invariant filter FP3, calculating the negative rectified second-order maximum oriented derivatives, is applied to the smoothed image IC0 in order to transform the smoothed image into a resultant image IC3, as shown in FIG. 7C, in which dark objects are reproduced on a light background.

The value of the second-order oriented derivative is first calculated by way of the above formula (4). At the current pixel the maximum of said second oriented derivative is calculated again, denoted as $MAX_\Theta[(L1)_{\Theta\Theta}]$, yielding a maximum intensity value which is then assigned to said current pixel, be it only if said value is negative; in the case where said value is positive, the value 0 (zero) is assigned to said current pixel as the intensity value replacing calculated values.

This negative rectification operation for the maximum values of second-order oriented derivatives yields the intensity value:

$$F_3 = MAX_\Theta^N [(L1)_{\Theta\Theta}]$$

which is assigned to the corresponding pixel of the two-dimensional matrix in order to form the new intensity image IC3.

FP4: Minimum value of positive rectified oriented second derivatives

Figure 7D:
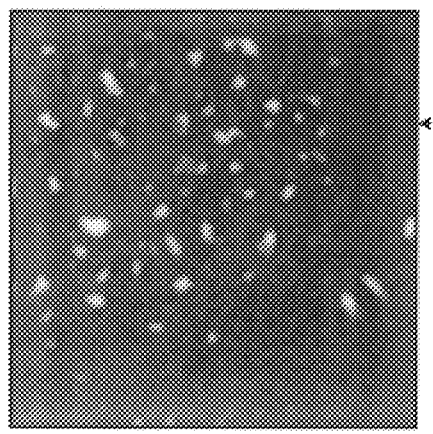

An invariant filter FP4, calculating the positive rectified minimum second-order oriented derivatives, is applied to the smoothed image IC0 in order to transform this smoothed image into a resultant image IC4, as shown in FIG. 7D, in which bright elongate objects are reproduced on a dark background.

At the current pixel the value already evaluated for the oriented second derivative by means of the formule (4) is taken again. Subsequently, at said current pixel the minimum of said oriented second derivative, denoted as $\text{MIN}_\Theta [(L1)_{\Theta\Theta}]$, is evaluated, yielding a minimum intensity value which is assigned to said current pixel, be it only if this value is positive; if this value is negative, the value 0 (zero) is assigned to said current pixel as the intensity value replacing the calculated value.

This operation of positive rectification of minimum values of second-order oriented derivatives produces the intensity:

$$F_4 = \text{MIN}_\Theta^P [(L1)_{\Theta\Theta}]$$

which is assigned to the corresponding pixel of the two-dimensional matrix in order to form the new intensity image IC4.

FP5: Minimum value of negative rectified oriented second derivatives

Figure 7E:
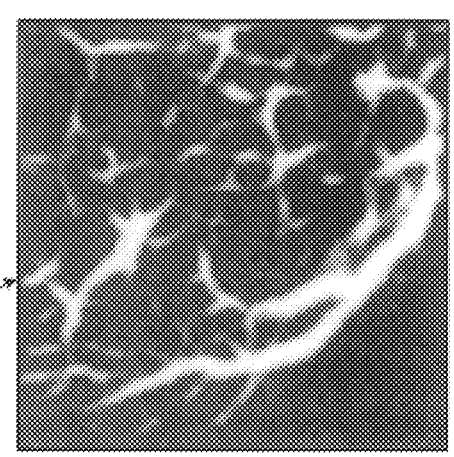

An invariant filter FP5, calculating the negative rectified minimum second-order oriented derivatives, is applied to the smoothed image IC0 in order to transform this smoothed image into a resulting image IC5, as shown in FIG. 7E, in which bright elongate objects are reproduced on a dark background.

For each pixel the value already evaluated for the oriented second derivative by means of the formule (4) is taken again. Subsequently, at the current pixel the minimum of this oriented second derivative, denoted as $\text{MIN}_\Theta [(L1)_{\Theta\Theta}]$, is taken again, yielding a minimum intensity value which is assigned to said current pixel, be it only if this value is negative; if this value is positive, the value 0 (zero) is assigned to said current pixel as the intensity value replacing the calculated value.

This operation of negative rectification of the minimum values of the second-order oriented derivatives yields the intensity $$F_5 = \text{MIN}_\Theta^N [(L1)_{\Theta\Theta}]$$

which is assigned to the corresponding pixel of the two-dimensional matrix in order to form a new intensity image IC5.

The rectification method adopted in the invariant filtering operations FP2, FP3, FP4, FP5 introduces a non-linearity into the otherwise linear filters. This operation is a "half-wave" rectification. This method enables separation of the positive responses of the filters from the negative responses of the same filters, and also elimination of the flat responses in the case where the image to be processed comprises striated objects, and hence reproduction of fine details of the objects in an image of positive responses and in an image of negative responses, respectively.

FP6: Product of the curvature of an object of the smoothed image IC0 and the intensity gradient An invariant filter FP6, calculating an intensity F6 equal to the product of the curvature K in the vicinity of the current pixel and the modulus of the intensity gradient $\|GR1\|$, is applied to the smoothed image IC0 in order to transform this smoothed image into a resultant image IC6, as shown in FIG. 7F, in which abrupt variations of curves, such as corners, are reproduced.

The modulus $\|GR1\|$ of the intensity gradient at the current pixel $P_0$ is first calculated as described above.

The curvature, denoted by the reference K, in the vicinity of this current pixel P0 is given by the formule (7):

$$K = \frac{(GR1)_y^2 (L1)_{xx} - 2(GR1)_x (GR1)_y (L1)_{xy} + (GR1)_x^2 (L1)_{yy}}{((GR1)_x^2 + (GR1)_y^2)^{3/2}} \quad (7)$$

The curvature K can thus be readily calculated by application of the formules (3a) and (3b) in the formule (7), after which the product of the curvature K and the modulus of the gradient (2) is calculated by means of the formule (8), yielding an intensity value $F_6$:

$$F6 = K \times \|GR1\| \quad (8)$$

At the end of the application of the first series of filters FP1 to FP6, for each pixel P0 of interest, at a given address, there is obtained:

a first set of 6 intensity characteristics which are formed by the intensities F1 to F6 extracted at said address in the images IC1 to IC6 formed during said first phase by the first series of invariant filters which reproduce truly local fine structures of the image, and constitute characteristic measurements of said local fine structures.

Figure 2A:
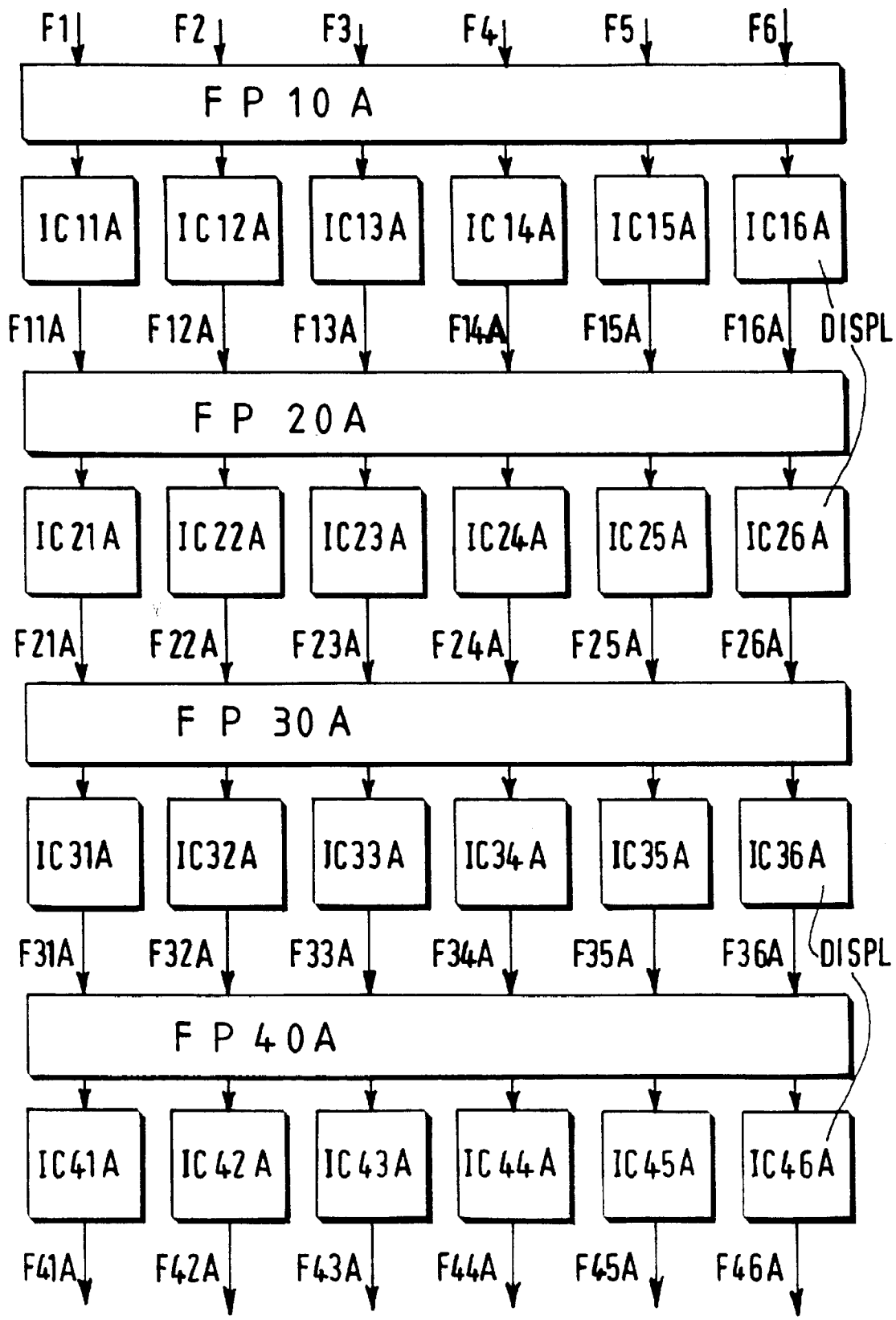
FIGS. 2A and 2B show a flow chart of a second phase of said first step in two chains A and B, respectively.
Figure 2B:
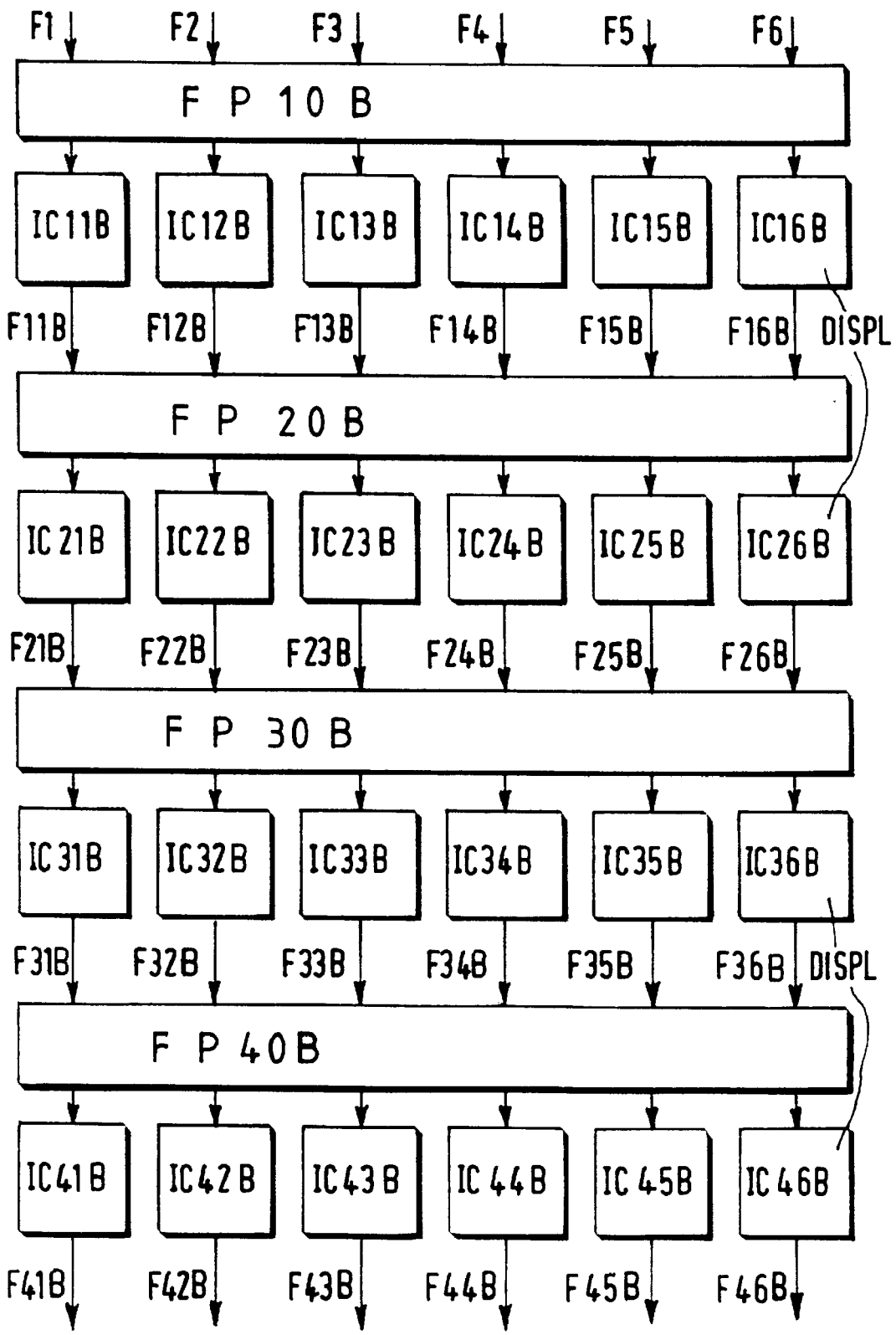

I.2 Second Filtering Phase (FIGS. 2A, 2B)

During a second phase as described hereinafter, the method reproduces global structures in the image by performing a summing operation on all previously calculated local measurements so as to obtain measurements which are characteristic of global structures.

This second phase of the first step comprises, not exclusively but preferably, the execution of 2 chains A and B of sub-steps in parallel.

Preliminary smoothing FP10A, FP10B

During this preliminary sub-step, each of the 6 images IC1 to IC6 previously formed is subjected in parallel to a smoothing operation with a first and a second resolution, respectively. To this end, Gaussian core oriented filters, called G5A and G10B in the chains A and B, respectively, are applied parallel to the axes X and Y in each of the six intensity images IC1 to IC6.

In the first chain A, the core of the Gaussian filter is at the scale of tumors, for example σ=5 pixels. The corresponding Gaussian function is called G5A.

In the second chain B, the core of the Gaussian filter is at the scale of the tissues surrounding the tumors, for example σ=10 pixels. The corresponding Gaussian function is called G10B.

At the end of this preliminary sub-step, for each current pixel $P_0$ at a given address there is obtained:

a second set of 6 intensity characteristics which are formed by intensity functions F11A to F16A, resulting from the convolution product of the first Gaussian function G5A and the intensity functions F1 to F6, respectively, fetched at this given address in each of said images IC1 to IC6, and expressed by the 6 relations:

$$F11A = G5A * F1$$

for forming an image IC11A until $$F16A = G5A * F6$$

for forming an image IC16A, a third set of 6 intensity characteristics which are formed by intensity functions, denoted by the references F11B to F16B and resulting from the convolution product of the second Gaussian function G10B and the intensity functions F1 to F6, respectively, fetched at said given address in each of said images IC1 to IC6, and expressed by the 6 relations:

$$F11B = G10B * F1$$

for forming an image IC11B until $$F16B = G10B * F6$$

for forming an image IC16B.

At the end of this first sub-step, each pixel to be treated is thus provided with 3×6=18 intensity characteristics, and this treatment enables the formation, on the basis of each of the six images IC1 to IC6 produced by the first phase, of two new corresponding smoothed images (not shown) such as IC11A and IC11B until IC16A and IC16B.

Determination of second structural characteristics

At the end of this preliminary sub-step FP10A, FP10B, each of the 12 smoothed images defined as IC11A to IC16A and IC11B to IC16B is subjected to a series of supplementary filters which are chosen from among differential rotation invariants.

Thus, in this second phase the method enables, by application of the second series of filters from FP20A to FP40A and from FP20B to FP40B, estimation of the spatial distribution of local structures previously reproduced during the first phase and the method supplies characteristic measurements of this spatial distribution, resulting in characteristic measurements of global structures of the image treated. The application of the filters F30A, F40A and F30B, F40B reproduces extreme intensity values in the images at the two scales generated by the Gaussian filtering F10A, F10B.

FP20A and FP20B: intensity gradient modulus filter

The application of the filters F20A, F20B reproduces intensity variations in the images at the two scales generated by the preceding Gaussian filtering F10A, F10B.

Hereinafter, the intensity gradient is called GR2A and GR2B for the chains A and B, respectively, and the modulus of the intensity gradient is called ||GR2A|| and ||GR2B||. These notations also receive an index 1 to 6 in conformity with the index of the image processed.

Thus, 6 new intensity functions are defined by calculating the modulus of the gradient applied to the intensity functions F11A to F16A in conformity with the formules ||GR21A|| to ||GR26A||.

Analogously, 6 supplementary intensity functions are defined by calculating the modulus of the gradient applied to the intensity functions F11B to F16B in conformity with the formules ||GR21B|| to ||GR26B||.

Application of these differential invariant filters FP20A, FP20B to the 2×6 intensity functions defined above yields:

a fourth set of 6 rotation-invariant characteristics per pixel, marked by an address in the two-dimensional matrix, denoted by:

$$F21A = ||GR21A|| \text{ to } F26A = ||GR26A||$$

and a fifth set of 6 characteristics, denoted by $$F21B = ||GR21B|| \text{ to } F26B = GR26B||$$

and resulting from the application of a calculation operator for the modulus of the gradient to the 12 intensity functions F11A to F16A and F11B to F16B, respectively.

FP30A and FP30B: isotropic Laplacian filter

The isotropic Laplacian, called LPA and LPB for the chains A and B, respectively, is obtained by composition of the second-order derivatives in conformity with the general relation:

$$LP = \frac{1}{2}[(L2)_{xx} + (L2)_{yy}] \tag{30}$$

Figure 10A:
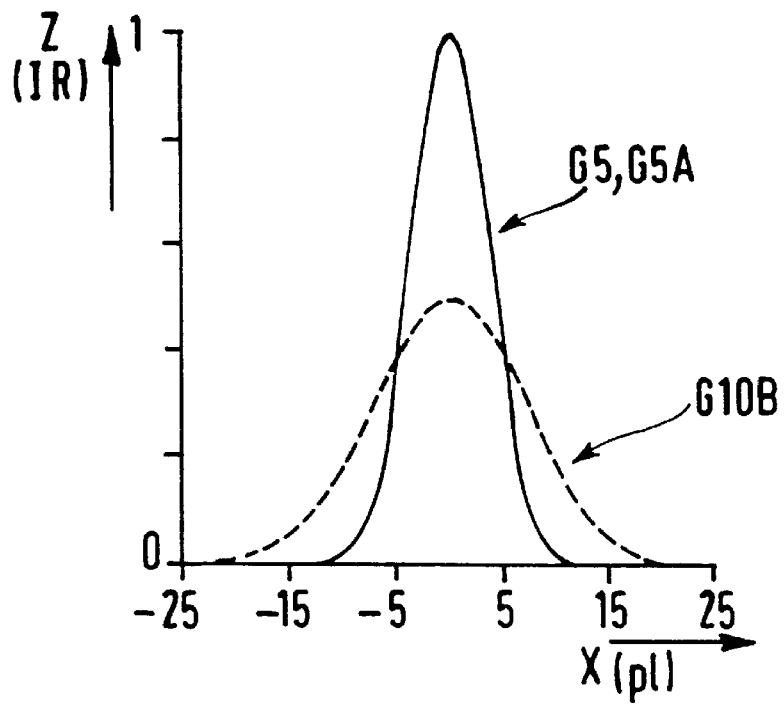
FIGS. 10A, 10B and 10C show pulse responses corresponding to the filters used.
Figure 10B:
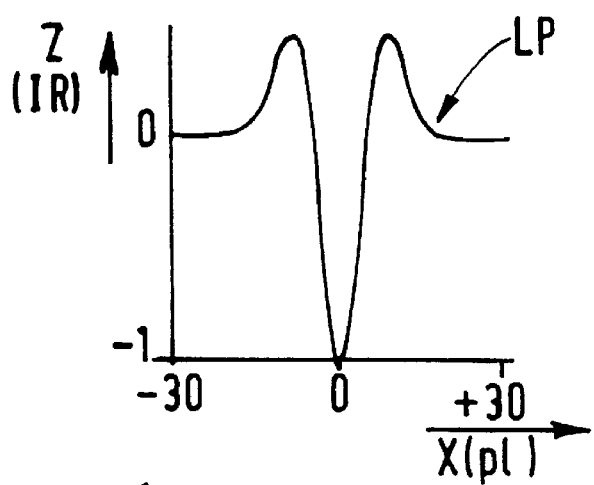

The general shape of the intensity response curve IR of a filter having the general formulation LP as its function is given in FIG. 10B in a representation which it is comparable to that of FIG. 10A.

The second-order derivatives $(L2)_{xx}$ in x and $(L2)_{yy}$ in y are now applied to the 12 intensity functions F11A to F16A and F11b to F16B defined in the preliminary sub-steps FP10A, FP10B, respectively.

Thus, 6 isotropic Laplacians are calculated which are applied to the intensity functions F11A to F16A in order to provide the intensities F31A=LP1A to F36A=LP6A in conformity with the relations LP1A to LP6A utilizing the formula (30), in which the indices 1 to 6 correspond to the indices of the images treated by the isotropic Laplacian.

For the intensity functions F11B to F16B the isotropic Laplacians are calculated in an analogous manner, yielding the intensity functions F31B=LP1B to F36B=LP6B.

In these expressions the second-order derivatives are given by relations analogous to the formulas (5a) to (5c) described above.

Application of these differential invariant filters FP30A, FP30B to the 12 intensity functions F11A to F16A, F11B to F16B yields:

a sixth and a seventh set of 6 intensity characteristics, called F31A to F36A and F31B to F36B, respectively, which are rotation-invariant, denoted per pixel by an address in the two-dimensional matrix of pixels with the axes X, Y, resulting from the application of an isotropic Laplacian calculation operator to said 12 intensity functions.

FP40A and FP40B: composition of second-order derivatives

These filters are applied to each of the 12 intensities F11A to F16A and F11B to F16B calculated in the preliminary sub-step FP10A, FP10B.

This composition of second-order derivatives is calculated in conformity with the general relation:

$$D2 = [(Q2)^2 + (S2)^2]^{1/2} \tag{40}$$

Figure 10C:
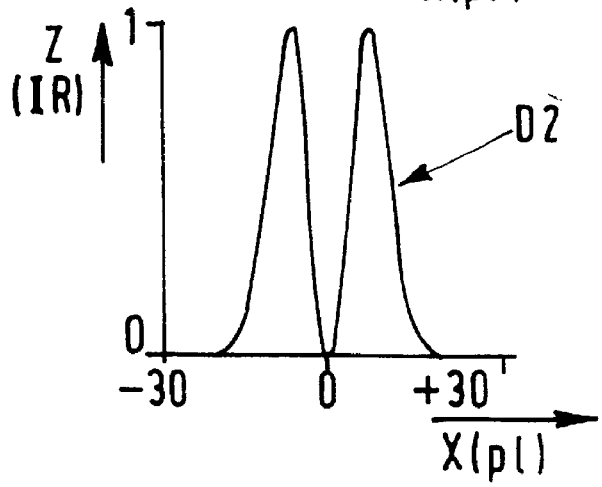

The general form of the intensity response curve IR of a filter having as its function the general formulation D2 is given in FIG. 10C in a representation which is comparable to that of FIG. 10A.

In this relation (40), Q2 and S2 are second-order derivatives defined by the general relations:

$$Q2 = \frac{1}{2}[(L2)_{xx} + (L2)_{yy}]$$

and $$S2 = (L2)_{xy}$$

Thus, 6 second-order derivatives are calculated which are denoted by the references Q21A to Q26A, and also 6 further second-order derivatives which are denoted by the references S21A to S26A which are applied to the intensity functions F11A to F16A given by:

$$Q21A = \tfrac{1}{2}[(L21A)_{xx} - (L21A)_{yy}]$$

to $$Q26A = \tfrac{1}{2}[(L26A)_{xx} - (L26A)_{yy}]$$

and $$S21A = (L21A)_{xy}$$

to $$S26A = (L26A)_{xy}.$$

The second-order derivatives of the intensity functions F11A to F16A are obtained by means of the formulas (5a) to (5c) described above.

The method of obtaining the gradients $(GR21A)_x$ to $(GR26A)_x$ and the gradients $(GR21A)_y$ to $(GR26A)_y$ has already been described with reference to the invariant FP20A, FP20B.

Using these relations, the differential invariant FP40A, applied to the 6 intensity functions F11A to F16A, is directly calculated, yielding the intensity functions F41A to F46A by application of the relation (40).

Subsequently, 6 second-order derivatives, denoted by the references Q21B to Q26B, are calculated and subsequently 6 other second-order derivatives which are called S21B to S26B and applied to the intensity functions F11B to F16B, again by means of the relation (40).

The second-order derivatives $(L21B)_{xx}$ to $(L26B)_{xx}$, $(L21B)_{yy}$ to $(L26B)_{yy}$, and $(L21B)_{xy}$ to $(L26B)_{xy}$ of the intensity functions F11B to F16B are preferably obtained by means of the relations (5a) to (5c).

The method of obtaining the gradients $(GR21B)_x$ to $(GR26B)_x$ and the gradients $(GR21B)_y$ to $(GR26B)_y$ has already been described with reference to the invariant FP20A, FP20B.

Using these relations, the differential invariant FP40B is obtained directly for application to the 6 intensity functions F11B to F16B, yielding the intensity functions F41B to F46B in conformity with the formule (40).

Application of the second-order differential invariant filter, FP40A, FP40B, to the 12 intensity functions F11A to F16A and F11B to F16B yields:

an eighth and a ninth set of 6 intensity characteristics each, denoted as F41A to F46A and F41B to F46B, which are rotation-invariant and marked for each pixel by an address in the two-dimensional matrix of pixels with the axes X, Y, resulting from the application to these 12 intensity functions of a calculation operator having a particular composition of second-order derivatives.

I.3 Third Phase (FIG. 3) for the Grouping of Characteristics in Vectors

At the end of the first and second phases, therefore, for the pixels of interest, having an address in the two-dimensional matrix, there have been defined 9 sets of 6 characteristics so a total of 54 intensity characteristics which reproduce details as regards shape, for example an elongate shape or a diffuse shape; as regards intensity, for example bright or dark; as regards contour, for example pronounced or slight curvature or corner shape; all the foregoing preferably with the resolution of tumors (chain A) as well as with the resolution of surrounding tissue (chain B).

It is to be noted that the number of 54 characteristics determined by the above method and the filters used for producing them are given merely by way of example.

Figure 3:
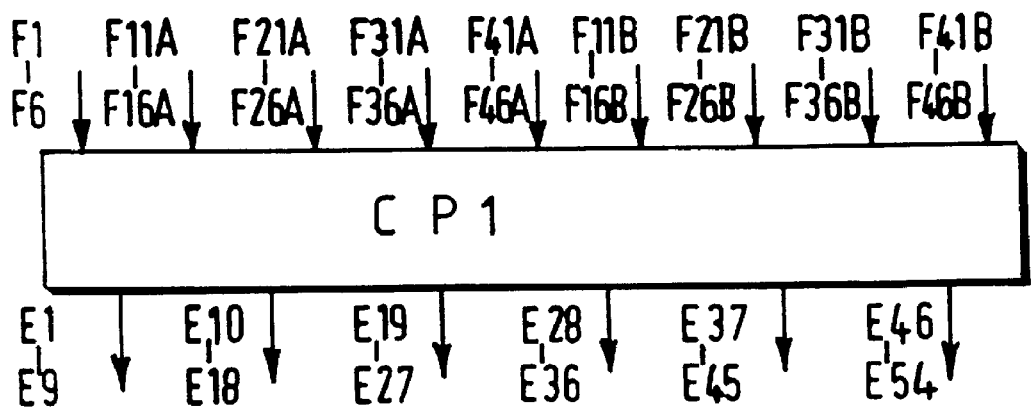
FIG. 3 shows a flow chart of a third phase of said first step.

In FIG. 3, the calculation means CP1 group the 9 intensity characteristics from the 9 images having the index 1, the 9 intensity characteristics from the 9 images having the index 2 etc. until the 9 intensity characteristics from the 9 images having the index 6; in other words, from the 6 images IC1 to IC6 the calculation means group 9 different types of characteristics which are due to the different results of the processing sub-steps, based on these 6 images and including the characteristics of said 6 images.

The calculation means CP1 gather these 54 intensity characteristics per pixel in order to form vectors of 54 intensity characteristics which are first measured for each pixel declared to be of interest in the images already examined from a medical point of view in which the radiologist himself has recognized the zones of malignant tumors and the healthy zones. These vectors then serve for the learning of a neural network, and subsequently for the testing of the correctness of the classification by this neural network.

Thus far it has been stated that the calculations were performed for each pixel of the original image; it is to be understood, however, that a preliminary selection of pixels of interest can be made in the original image, or that the original image may be a zone of interest taken from a much larger image.

The same method for determining 54 characteristics per pixel is ultimately also carried out, by means of the same neural network having learned to do so, for the automatic detection of cancer zones in images which have not previously been subjected to medical diagnosis.

At the end of the recursive filtering forming the differential operators in the phases 1 and 2 of the method, the calculation means CP1 have thus generated a vector of m=54 characteristics per pixel of interest. It may also be said that 54 images constituted by these m characteristics have been formed.

II) SECOND STEP: DETECTION AND REPRODUCTION OF CANCER ZONES

II.1) First Phase: Classification by NN

The calculation means CP1 have thus encoded an image in a manner which is compatible with the inputs of a classification system such as, for example a neural network; such encoding enables the introduction of all information informing the neural network how the intensity varies, with the given resolution, around a given pixel as a function of the axes x and y in the various regions of the images and, from among these regions, in specific regions of particular interest to the radiologist. Encoding is adapted to the neural network in such a manner that it can classify the pixels of interest in four classes K1 to K4 in an effective manner. Classification is to be understood to mean that the neural network NN assigns to each pixel a first probability of belonging to the class K1, a second probability of belonging to the class K2, a third probability of belonging to the class K3, and a fourth probability of belonging to the class K4. This information suffices to form a probability image for each pixel of interest as belonging to the four classes defined hereinafter:

K1: class of cancer zones
K2: class of non-suspect uniform opacities
K3: class of peripheral breast regions
K4: other regions When the vector of m characteristics has been defined for each of the pixels of interest of the original image, the vector is applied (see FIG. 4) to the input of a neural network NN, comprising a corresponding number of m inputs $E_1$ to $E_m$, a single hidden layer of 40 neurons, and a number of k outputs equal to the number of diagnostic classes, so 4 outputs K1 to K4 in this case.

Figure 5A:
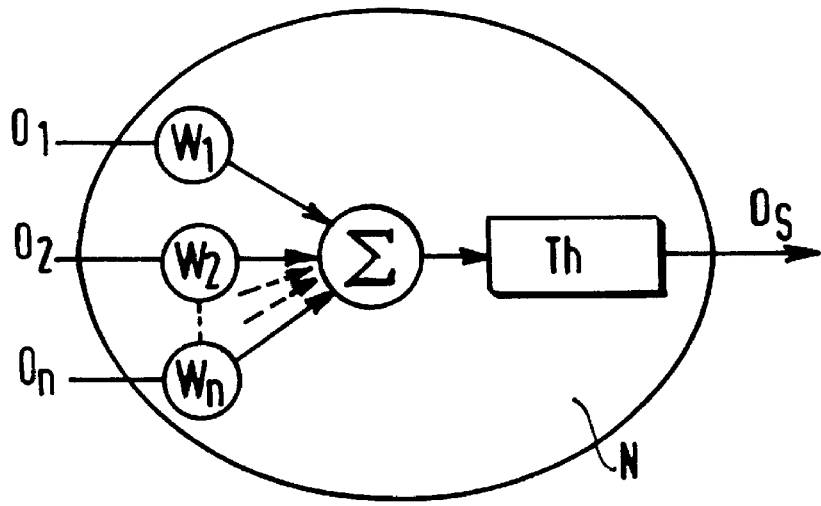
FIGS. 5A and 5B show the elements of a neural network.
Figure 5B:
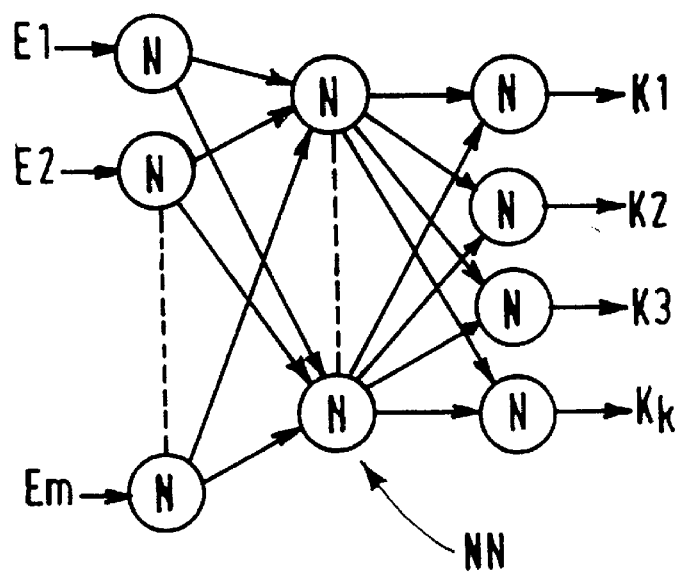

FIGS. 5A and 5B show a neural network composed of several calculation elements which are referred to as neurons N which are arranged in layers. Each element or neuron N supplies an output signal $O_S$ and can receive one or more input signals $O_1$, $O_2$, etc. The output is activated when the sum $\Sigma$ of the input signals weighted by weights W1, W2 etc. exceeds a given threshold function Th which is called an activation function.

A neural network performs a learning phase which requires a database. According to the proposed method, the data is fetched from a given number of pathological mammographic images which have already been examined by a radiologist and consist of a plurality of characteristic vectors which relate to points belonging to regions of these images which are already known to be cancer regions or healthy regions. During this learning phase, the characteristic vectors are applied to the inputs of the neural network. The weights of the neural network are thus fixed to ensure that the network classifies each point correctly as a point belonging to a specific cancer zone or as a point belonging to the various other regions of the mammogram in which there is no cancer.

At the end of the learning phase of the neural network, the same steps of the method are applied to new images, not previously examined, in order to classify the pixels automatically in zones of the same predetermined type as the zones entered for learning.

Each pixel of interest is thus given the four probability values, representing the probability of the pixel belonging to each of the diagnostic classes K1 to K4.

III.2) Second Phase CP2 for the Segmentation in 4 Classes

Figure 4:
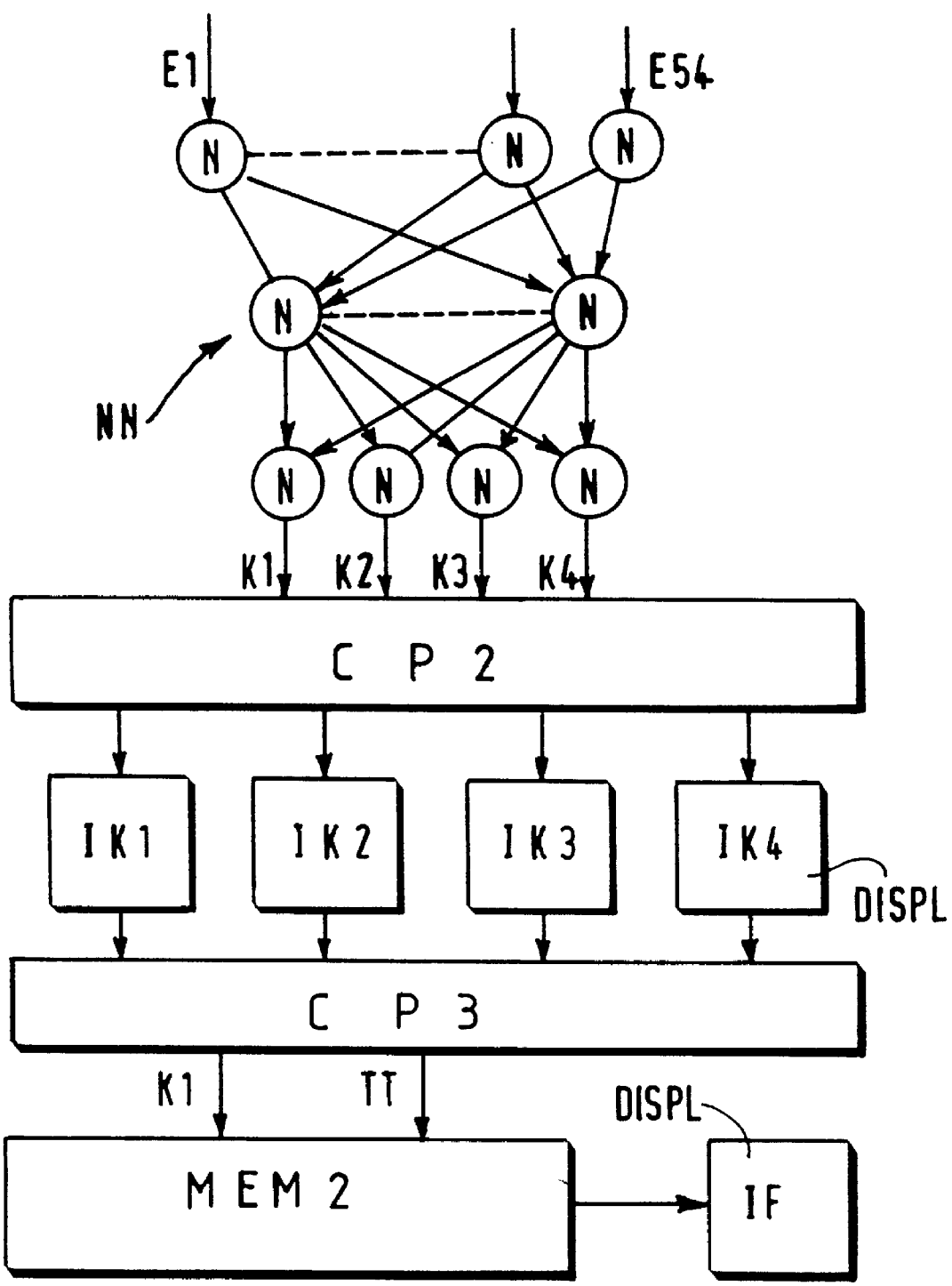
FIG. 4 shows a flow chart of a second step of the automatic method.

FIG. 4 shows that at the output of the neural network NN there are obtained, instead of the original image formed by the selected pixels of interest, probability values PK1 to PK4 which enable the formation of four so-called activation images IK1 to IK4, each of which represents the result of the activation function of the corresponding output K1 to K4 of the neural network.

During this second phase, the pixels at the output of the neural network are labeled and grouped in regions, each of which corresponds to one of the classes K1 to K4, by means of calculation means CP2. Thus, all pixels of a class whose probability value is higher than a predetermined threshold are labeled as belonging to this class and are grouped according to proximity criteria.

Figure 8A:
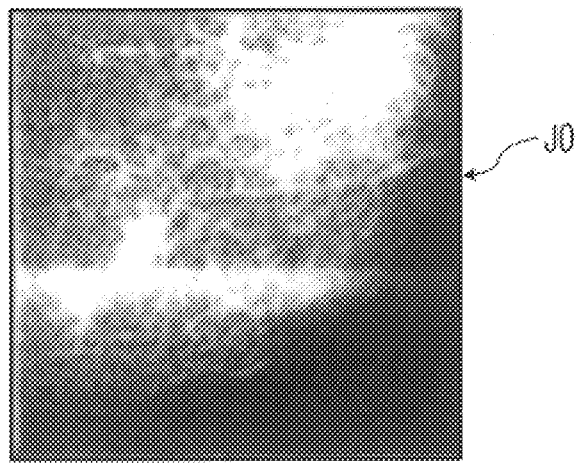
FIGS. 8A to 8C show an initial mammographic image, the image segmented into four classes, and the corresponding final image produced for the automatic marking of the cancers.
Figure 8B:
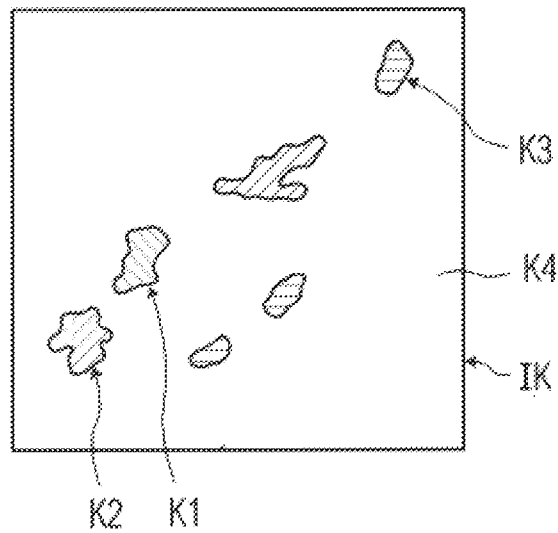
Figure 9A:
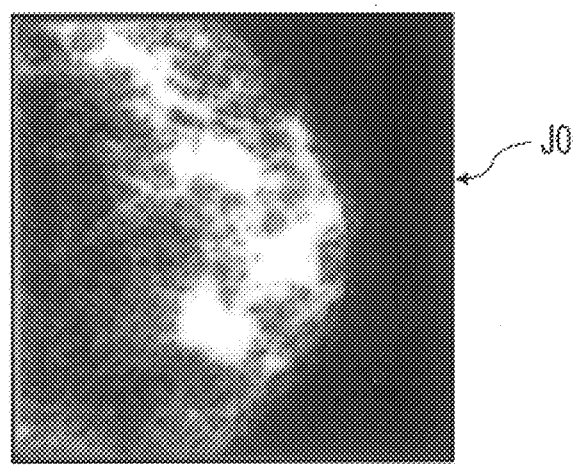
FIGS. 9A to 9C show a further initial mammographic image, the image segmented in four corresponding classes, and the corresponding final image.
Figure 9B:
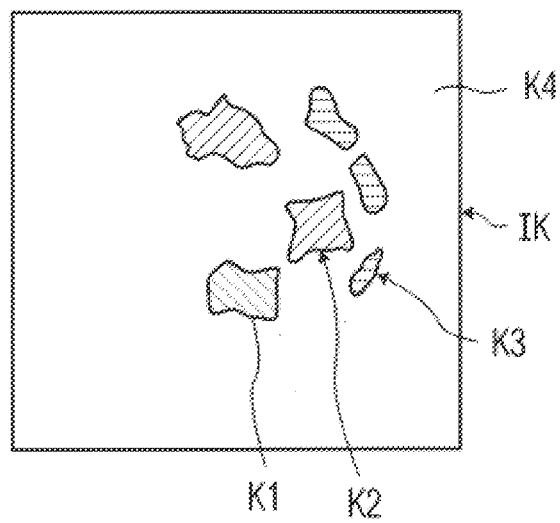

FIG. 8A shows, by way of example, a digitized intensity image J0 relating to a first pathological case. FIG. 8B shows an activation image IK in which, for the sake of simplicity of drawing, the elements of 4 activation images IK1 to IK4 of FIG. 4 are grouped in order to reproduce the regions formed by pixels having a high probability value in the 4 output classes K1 to K4 of the neural network. To this end, to all pixels of the image J0 at the output of the neural network there is assigned a given probability of belonging to each of the four classes. In order to form the activation image of FIG. 8B, it has been decided a priori that a pixel belongs to a given class if its probability of belonging to this class is higher than or equal to 40%. This choice may be more or less strict. FIG. 9A shows, as a second example, a further intensity image J0 which relates to another pathological case. FIG. 9B shows an activation image IK in which, as before, the elements of the 4 activation images IK1 to IK4 of FIG. 4 are grouped in order to reproduce the regions formed by pixels having a high probability value in the 4 classes K1 to K4 of the neural network, so that it corresponds to the image of FIG. 9A. This demonstrates how the neural network enables detection of the various regions of specific interest which correspond to the classes K1 to K4.

Thus, it may occur that a pixel of interest has a high probability value, for example higher than or equal to 40%, with respect to more than one class. However, the pixel of interest may ultimately be found only in a single diagnostic class, i.e. in a single activation image. The other high probability values attributed thereto are in reality false alarms.

These false alarms must be eliminated. To this end, the method in accordance with the invention comprises a third phase.

II.3) Third Phase CP3 for Segmentation into Two Classes

The object of the invention is to determine ultimately only the cancer zones K1 and to separate these zones from all other pixels then referenced TT.

This operation is performed in the calculation means CP3. The aim is to select the pixels belonging to the cancer zones in an effective manner, that is to say all pixels belonging to these cancer zones, so as to obtain 100% true positives, particularly without omitting any cancer zone.

According to a first simple method, the cancer zones saved are the regions formed by the grouping of the pixels which are labeled in the class K1 and have a probability of belonging to this class which exceeds a predetermined threshold, for example 40%. From these regions there are selected the zones having a diameter equal to or larger than a threshold, for example 3 mm or 4 mm. According to this method the pixels which do not satisfy these two conditions, either because they are isolated or because their probability value is too low, are grouped in a class referenced TT for all other regions which are thus deemed to be healthy.

According to a second, preferred method, risk zones or so-called "suspect zones" are chosen in the image J0, either manually by the radiologist or automatically by calculation means (not described) in which the number N of pixels are counted, the sum of the probabilities PK1 of the pixels belonging to the single class K1 of cancer are summed, and said sum is divided by the number N of pixels, thus producing the mean probability of the pixels in each "risk zone" belonging to the cancer class K1. If this mean probability is higher than a predetermined threshold, for example 40%, the "suspect zone" is deemed to be "a cancer zone".

The second method offers better results, i.e. it yields a larger number of positive true alarms TA detected for a same number of positive false alarms (zones unduly detected as cancers) than the first method.

Figure 8C:
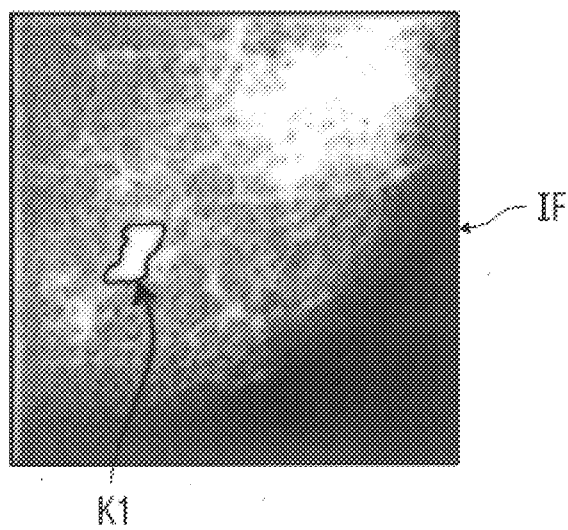
Figure 9C:
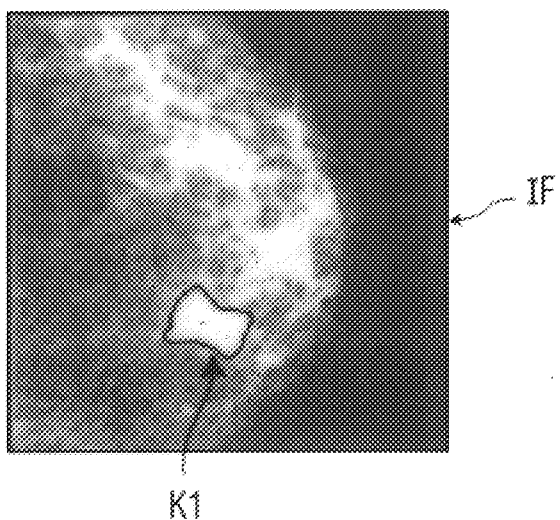

The FIGS. 8C and 9C show a final image, corresponding to the images of the FIGS. 8A and 9A, respectively, in which a cancer zone found has been demarcated in order to reveal this pathology as a diagnostic aid.

Figure 11:
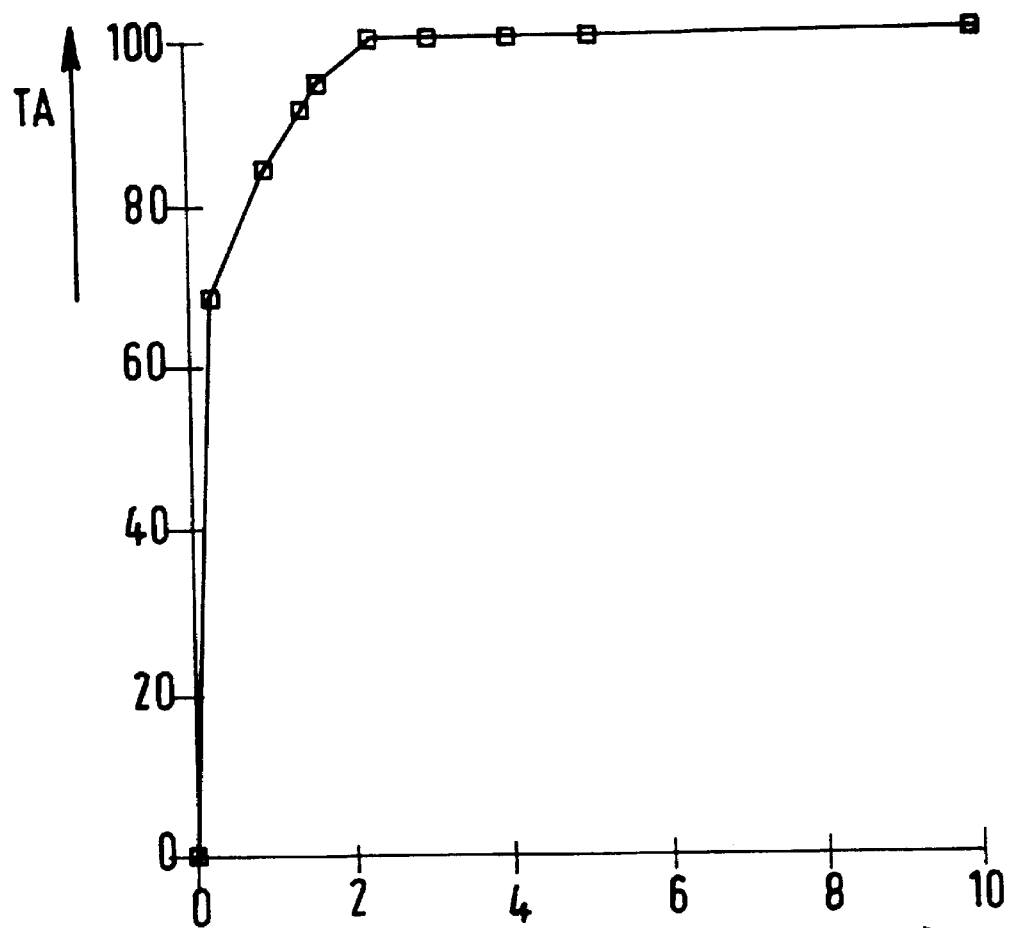
FIG. 11 illustrates the results of tests performed on the device; the curves (ROC) show the true alarm rate TA as a function of the false alarm rate FA.

The curve "ROC" (=Receiver Operating Curve) of FIG. 11 illustrates the results obtained by the preferred version of the present method. In order to form this curve, the conclusions yielded by the present method in respect of the cancer zones and the healthy zones are verified by laboratory analysis, for example by biopsies. Along the curve of FIG. 11, based on 50 analyzed images, 100% positive true alarms TA were found for 2 positive false alarms FA, the cancer zones retained being larger than or equal to 3 mm.

The Device and the System

Figure 12:
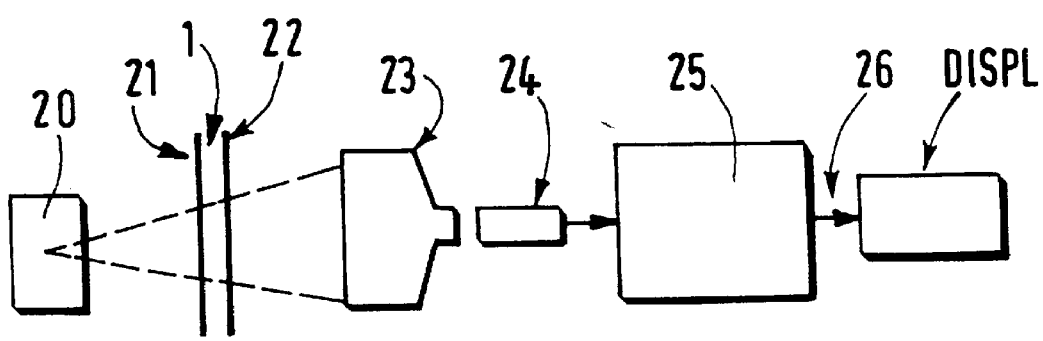
FIG. 12 shows a device for forming X-ray images, including an image pick-up device and an image processing device for processing the mammographic images by means of a method for the automatic detection and reproduction of regions of a predetermined type of cancer.

FIG. 12 shows a digital radiography system which includes an X-ray source or other radiation source 20, plates 21, 22 for pressing the breast 1 of the patient to be radiographed, an image intensifier device 23 which is coupled to a camera tube 24 which applies data to a processing system 25 which serves to digitize the images and is connected to a microprocessor. The latter comprises a plurality of outputs, including an output 26 which is coupled to a monitor DISPL for displaying the radiographic image or the intensity image at any stage of the treatment.

Reference is now made to the diagrams of the FIGS. 1, 2A, 2B, 3 and 4, the digital image supplied by the system 25 is stored in storage means MEM1 in the form of data which is accessible to the microprocessor (not shown). The latter processes the data stored in MEM1, in conjunction with a computer station (not shown) and, preferably according to the process described above, in order to detect automatically regions of a predetermined type of cancer and to supply final intensity images with visual marks, for example lines demarcating said cancer regions as shown by way of example in the images of FIGS. 8C and 9C, which can be displayed, under the control of the computer, for example on a screen DISPL, or can be printed.

The image processing device for the automatic detection of regions of a predetermined type of cancer thus comprises: an acquisition system (23, 24, 25) for an image of a region of a human or animal body, a memory MEM1 for storing the intensity image J0, for example in the form of a two-dimensional matrix of pixels having digitized intensity values, means for the automatic processing of the image which have access to said memory, and means DISPL for displaying said image with visible indications for marking the detected regions of the predetermined type of cancer in this image.

According to the FIGS. 1 to 4, the processing means in this device comprise first processing means for generating, for each pixel, a vector from a plurality of intensity characteristics, with:
a) one or more first oriented filtering means FP0, FP10A, FP10B for applying a respective Gaussian operator G5, G5A, G10B so as to yield one or more smoothed images IC0 or IC11A to IC16A, IC11B to IC16B with one or several scales,
b) one or several second oriented filtering means FP1 to FP6 or FP10, FP20, FP30, FP40 for applying one or several rotation-invariant, oriented, differential operators of the first or the second order to each smoothed image,
c) calculation means CP1 for performing the grouping of the results of the operators, supplying the characteristics of the vector searched, relating to each pixel of interest having an address in the two-dimensional matrix, and second processing means which include:
d) a neural network NN for receiving, at its inputs E1 to $E_m$ where m is preferably 54, for each pixel concerned the vector of characteristics relating to said pixel and for performing a classification of said pixel, on the basis of its vector of characteristics, into various classes, such as K1, K2, K3, K4, of probability of belonging to different regions of the image, one class being the class K1 of pixels of the regions of cancer, and a class TT of the other regions,
e) calculation means CP2, CP3 for constructing a final image IF which is segmented into a region of the predetermined type of cancer and other regions.

Preferably, the device is used for the automatic detection of regions of cancer of the "opacity" type in mammograms of the human body.

Alternative embodiments of the device can be used for the automatic detection of opacities in tomography images or in images obtained by magnetic resonance imaging.

We claim:

1. An image processing method for automatic detection of regions of a predetermined type of cancer in an intensity image of a part of a human or animal body, which method includes, for each of a number of points in a part of said image, determining a respective associated vector having components formed by characteristic values derived from the intensity distribution around the associated point in said part of the image, and using a classification system for determining the probability of the point associated with said vector belonging to a region of said part of the image which corresponds to the predetermined type of cancer or to another region, wherein said vector is determined by:

applying one or several first filters so as to transform the part of the intensity image into one or more smoothed images with one or several resolutions respectively, applying one or several rotation-invariant, oriented second filters to each smoothed image in order to enhance intensity variations and to accentuate structural characteristics with each resolution, and grouping the results of applying the first and second filters in order to supply the components of the vector.

2. A method as claimed in claim 1, which includes reproducing, in the part of the intensity image, potential regions of cancer of the predetermined type, including selecting points having a probability rate exceeding a predetermined threshold as points belonging to the class of regions of the predetermined type of cancer, labeling these points in order to group these points in cancer regions, and segmentation of the part of the intensity image into two classes of points, one class being a class of points of regions of the predetermined type of cancer whereas the other class is a class of points of regions not of the predetermined type.

3. A method as claimed in claim 1, in which the smoothing filters are Gaussian operators and the rotation-invariant oriented filters are first or second-order differential operators or compositions of these operators.

4. A method as claimed in claim 3 which comprises a first step, including a first phase, with a first sub-step of applying a Gaussian operator in order to produce, on the basis of the intensity image, a smoothed image with the resolution of the cancer regions searched, and a second sub-step of applying a plurality of rotation-invariant first or second-order differential operators to said smoothed image in order to produce images of structural characteristics, said rotation-invariant differential operators including:

an operator for calculating first-order oriented derivatives, yielding the modulus of the gradient of the intensity around the current point of the smoothed image;

operators for calculating second-order intensity oriented derivatives for selecting on the one hand at the same point the maximum positive value from the second-order oriented derivatives and, if this value cannot be found, assigning the intensity value zero to the relevant point, and on the other hand selecting at the same point the maximum negative value from said second-order oriented derivatives and, if this value cannot be found, assigning the intensity value zero to the relevant point;

operators for calculating second-order intensity oriented derivatives for selecting on the one hand at the same point the minimum positive value from said second-order oriented derivatives and, if said value cannot be found, assigning the intensity value zero to the relevant point, and on the other hand selecting at the same point the minimum negative value from said second-order oriented derivatives and, if this value cannot be found, assigning the intensity value zero to the relevant point; and an operator for calculating the product of the curvature at the vicinity of the current point and the modulus of the intensity gradient.

5. A method as claimed in claim 4 which comprises, in the first step, a second phase which includes:

a first and/or a second processing chain (A, B) with a first sub-step of applying a Gaussian operator in order to supply, on the basis of images produced by the rotation-invariant differential operators of the first phase, new smoothed images with the resolution of the cancer regions searched and/or the resolution of the tissues surrounding the cancer regions searched, and with a second sub-step of applying further rotation-invariant differential operators to said new smoothed images in order to produce images of structural characteristics, said further rotation-invariant differential operators including:

an operator for calculating first-order intensity oriented derivatives which produces the modulus of the intensity gradient at the current point of said new smoothed images;

an operator for calculating second-order intensity oriented derivatives which produces the isotropic Laplacian at the same point, and an operator for calculating second-order intensity oriented derivatives which produces a rotation-invariant combination of second-order oriented derivatives at the same point.

6. A method as claimed in claim 5, in which the second phase of the first step is executed in parallel in the first chain (A) and in the second chain (B).

7. A method as claimed in claim 1, in which the intensity image is a mammographic image of the human body.

8. A method as claimed in claim 7, in which the classification system is a neural network which classifies the points in four classes of probability, including a class of points of regions of the predetermined type of cancer, a class of points of opaque regions of the interior of the breast, a class of points of regions of the peripheral breast, and a class of points of other regions, and in which the composition of a final image includes a thresholding operation which is applied to the rate of probability of points belonging to the class of regions of cancer, selection of points having a probability rate exceeding said threshold as points belonging to the class of regions of the predetermined type of cancer, labeling of said points in order to group the points in regions of cancer, selection of regions whose extent exceeds a surface threshold, and segmentation of the intensity image into two classes, including one class of points of selected regions of the predetermined type of cancer and one class of points of other regions.

9. Apparatus for automatic detection of regions of a predetermined type of cancer in an intensity image of a part of a human or animal body, including an image processing device for processing a number of points in a part of said image, said image processing device comprising vector determining means for determining a a respective vector associated with each processed point and having components formed by characteristic values derived from the intensity distribution around the associated point in said part of the image, and classification means for determining the probability of the point associated with said vector belonging to a region of said part of the image which corresponds to the predetermined type of cancer, or to another region, wherein said vector determining means comprises:

a) one or more first means for oriented filtering in order to apply a respective Gaussian operator so as to produce one or more smoothed images with one or several scales, respectively.

b) one or more second oriented filtering means for ultimately applying one or more rotation-invariant first-order or second-order differential operators to each smoothed image; and c) calculation means for grouping the results of the operators applied by the first means for oriented filtering and the second oriented filtering means so as to produce the characteristics of the intensity characteristic vector searched for each point.

10. An apparatus as claimed in claim 9 which also includes means for reproducing in the original image potential regions of cancer of the predetermined type, including means for selecting points having a probability rate which exceeds a predetermined threshold as points which belong to the class of the regions of the predetermined type of cancer, for labeling said points in order to group these points in regions of cancer, and for segmenting the original image into two classes of points, one of which is a class of points of regions of the predetermined type of cancer while the other class is a class of points of the other regions.

11. An apparatus as claimed in claim 10, in which the the classification system comprises a neural network which is arranged to receive at its inputs, for each point concerned, the characteristic vector relating to said point, and to perform a classification of said point on the basis of its characteristic vector in different classes of probability of belonging to different regions of the image, one class being the points of regions of cancer and one class relating to the other regions.

12. An apparatus as claimed in claim 10, further comprising an imaging system for the acquisition of an image of a region of a human or animal body, a memory for the storage of the image in the form of a two-dimensional matrix of pixels having digitized intensity values, said image device processing having access to said memory, and means for displaying said image with visible indications so as to mark the detected regions of the predetermined type of cancer in said image.

13. An apparatus as claimed in claim 9, further comprising an imaging system for the acquisition of an image of a region of a human or animal body, a memory for the storage of the image in the form of a two-dimensional matrix of pixels having digitized intensity values, said image processing device having access to said memory, and means for displaying said image with visible indications so as to mark the detected regions of the predetermined type of cancer in said image.

14. An apparatus as claimed in claim 13 wherein said imaging system is an X-ray, tomography or magnetic resonance imaging system.

15. An apparatus as claimed in claim 9, wherein said classification means is configured for selection of points having a probability rate exceeding a predetermined threshold as points belonging to the class of regions of the predetermined type of cancer, labeling of these points in order to group these points in cancer regions, and segmentation of the intensity part into two classes of points, one class being a class of points of regions of the predetermined type of cancer whereas the other class is a class of points of the other regions.

16. An apparatus as claimed in claim 15, further comprising an imaging system for the acquisition of an image of a region of a human or animal body, a memory for the storage of the image in the form of a two-dimensional matrix of pixels having digitized intensity values, said image device processing having access to said memory, and means for displaying said image with visible indications so as to mark the detected regions of the predetermined type of cancer in said image.

* * * * *